United States Patent [19]
Antonuccio et al.

[11] Patent Number: 6,141,213
[45] Date of Patent: Oct. 31, 2000

[54] COMPUTER WITH HIGH AIRFLOW AND LOW ACOUSTIC NOISE

[75] Inventors: Robert S. Antonuccio, Burlington, Mass.; Thomas E. Stewart, Los Altos, Calif.; Joseph M. Spano, North Reading, Mass.; Mathew J. Palazola, Glochester, Mass.; William A. Izzicupo, Windham, N.H.; James M. Carney, Pepperell, Mass.; Daniel D. Gonsalves, Hudson, N.H.; Mark R. Pugliese, Shrewsbury, Mass.

[73] Assignee: Sun Microsystems, Inc., Mountain View, Calif.

[21] Appl. No.: 08/882,317

[22] Filed: Jun. 24, 1997

[51] Int. Cl.[7] ............................... G06F 1/20; H05K 7/20; F25D 23/12
[52] U.S. Cl. ........................................... 361/687; 361/695
[58] Field of Search ..................... 361/687, 695, 361/688, 690, 692, 694

[56] References Cited

U.S. PATENT DOCUMENTS

| | | | |
|---|---|---|---|
| 4,461,796 | 7/1984 | Fukahori et al. | 428/116 |
| 4,713,714 | 12/1987 | Gatti et al. | 360/137 |
| 5,375,038 | 12/1994 | Hardt | 361/694 |
| 5,493,474 | 2/1996 | Schkrohowsky et al. | 361/695 |
| 5,526,228 | 6/1996 | Dickson et al. | 361/695 |
| 5,528,454 | 6/1996 | Niklos | 361/695 |
| 5,544,012 | 8/1996 | Koike | 361/695 |
| 5,547,272 | 8/1996 | Paterson et al. | 361/695 |
| 5,596,483 | 1/1997 | Wyler | 361/683 |
| 5,673,029 | 9/1997 | Behl et al. | 361/695 |
| 5,694,294 | 12/1997 | Ohashi et al. | 361/687 |
| 5,793,608 | 8/1998 | Winick et al. | 361/695 |
| 5,813,243 | 9/1998 | Johnson et al. | 361/687 |

FOREIGN PATENT DOCUMENTS

| | | | |
|---|---|---|---|
| WO 95 32457 | 11/1995 | WIPO | G06F 1/20 |
| WO 97 26781 | 7/1997 | WIPO | H05K 7/20 |

OTHER PUBLICATIONS

Patent Abstracts of Japan, vol. 12, No. 443 (P–790), Nov. 22, 1988.

Anon: Redundant Cooling for a High Availability CPU Enclosure, IBM Technical Disclosure Bulletin, vol. 37, No. 8, Aug. 1994, pp. 557–560.

Anon: Segmented Cooling for Personal Computers, IBM Technical Disclosure Bulletin, vol. 36, No. 10, Oct. 1993, pp. 431–434.

Anon: Low Noise Air Cooling, IBM Technical Disclosure Bulletin, vol. 24, No. 12, May 1982, p. 6322.

*Primary Examiner*—Leo P. Picard
*Assistant Examiner*—Lisa Lea-Edmonds
*Attorney, Agent, or Firm*—Blakely Sokoloff Taylor & Zafman

[57] ABSTRACT

The invention relates to a computer system and method thereof characterized by high airflow and low acoustic noise by separating the enclosure of the system into two sections, in which in one section cooling fans are arranged between power supply units and disk drives, the power supply units being located at the back of the section and the fans, as to the disk drives, serving as exhaust fans, and in the other section inlet fans are arranged to cool selected hardware electrical elements, such as CPU modules, PCI and graphics cards, wherein the placement of the inlet fans is selected to minimize pre-heated air and fan airflow paths are controlled and directed by an air dam to maximize the cooling effect, and noise damping material is employed in mounting the rack for the disk drives, the disk drives and fans and in forming the side walls of the enclosure.

25 Claims, 6 Drawing Sheets

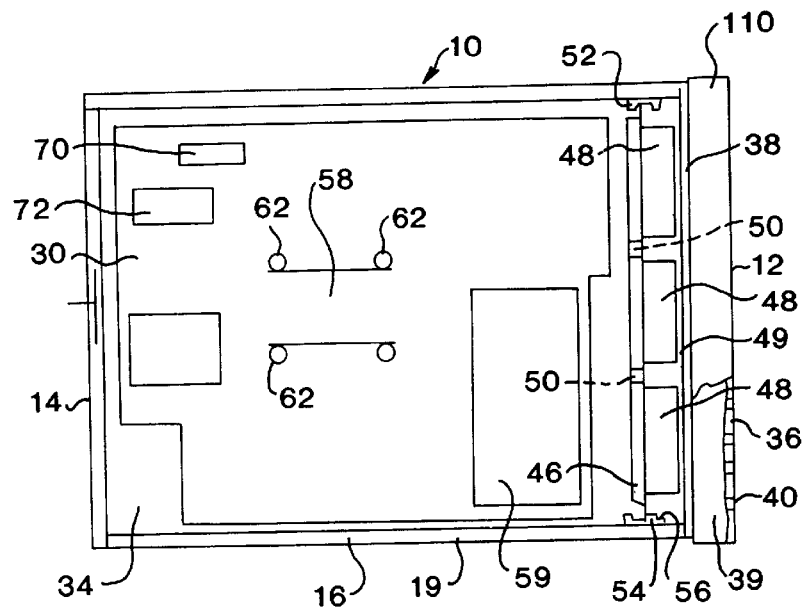
FIG. 4
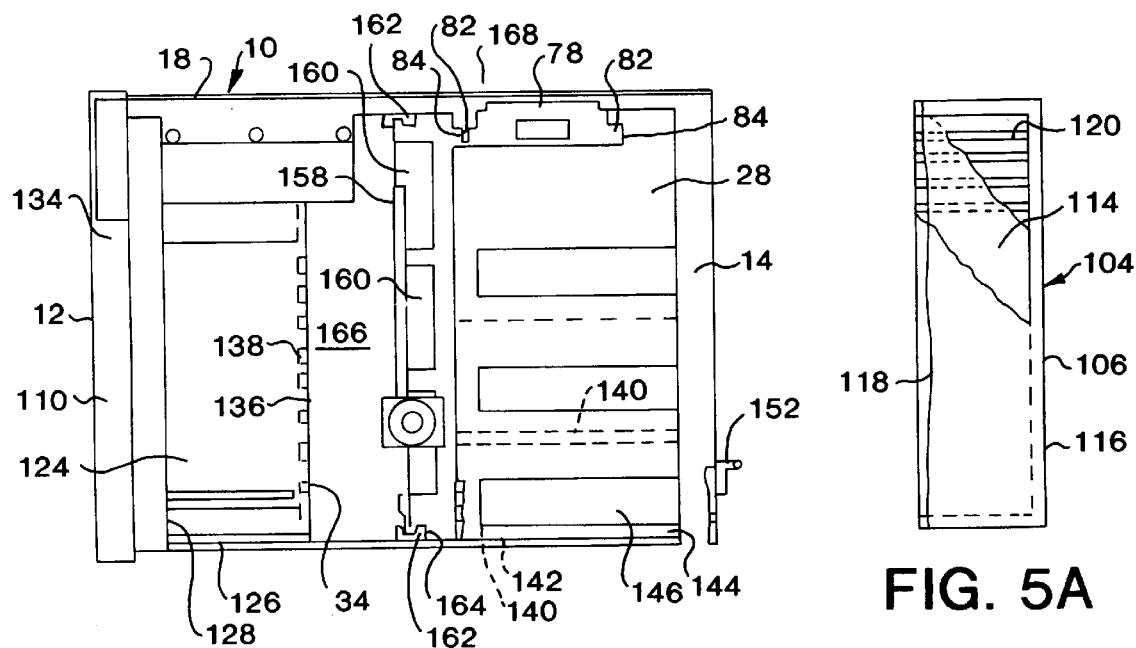
FIG. 5
FIG. 5A

COMPUTER WITH HIGH AIRFLOW AND LOW ACOUSTIC NOISE

BACKGROUND OF THE INVENTION

This invention relates to a computer system constructed and having certain components arranged to provide relatively high airflow through the enclosure thereof in a manner that lessens associated acoustic noises, and having its electrical elements requiring cooling arranged to best take advantage of the airflow. The invention also relates to a method of constructing such a system and in arranging the referenced components and elements.

A long standing problem in computer systems has been the difficulty in providing in an effective, economical and reliable manner sufficient cooling of electrical elements that require temperature management, such as high power system boards, multiple CPU modules and power sources. The providing of the necessary high airflow cooling for such elements creates an concomitant problem of high levels of acoustic noises. This is particularly undesirable with respect to certain high end deskside and under-the-desk workstation computer systems when located, for example, in a one person office setting. In the first instance the concern is to avoid damage to the elements in question caused by over heating, in the latter the concern is to improve the working environment of the persons using the systems.

It has been the general practice in such systems to arrange the hardware heat generating elements in a common enclosure, for example heat sensitive elements such as system boards, power supply units, CPU modules, graphics, S bus and PCI cards, disk drives etc. Such systems do not allow all of the elements in need of cooling to be strategically located to obtain the most effective cooling in terms of the paths of the airflow of the fans and/or blowers provided for cooling the elements. A particular problem in this regard is presented in systems having a large number of disk drives, CPU, graphics and PCI modules and/or cards and multiple power supply units, which represent great heat generating sources. In addition the airflow paths are not utilized to the best advantage to maximize the supplied cooling, but instead are interfered with by components, parts and the structures of the systems, which interferences in turn require higher fan speeds than what otherwise would be required to force the air through the systems and do not allow the flow of air to be evenly distributed throughout the systems. Also, in past systems as to the need to use higher fan speeds, the lack of ample intake and exhaust areas in the enclosures increased airflow impedance which also increased the acoustic noises. In these systems in many cases the high speed fans or blowers are usually arranged at the back of the enclosures adjacent to the power supply unit or units, while other electrical elements also requiring cooling may be located a distance from the fans or blowers.

The referenced problems and conditions, together with the manner of supporting certain of the elements and components of the systems, such as the power supply units, disk drives, fans and blowers and enclosure side walls, and the inherit high airflow impedance condition not only fostered a situation that created acoustic noises but allowed the amplification thereof. The high impedance condition is created by the system construction that requires air to move or be pushed through small cooling holes, tight spaces and around bends, all of which reduce airflow and require an increase in the pressure of the cooling air. The selection of fan speed in the past to provide the required cooling has been influenced by the size, type and number of fans that the limited space available in the enclosure would allow, which space when exhausted left the only option to increase the speed of the fans in an attempt to overcome the conditions noted above. The speed and type of the fans is a major source of acoustic noise of the systems, both as to the direct noise i.e. fan rotational noise and the indirect noise i.e. vibrational noises and air resistance of various elements caused by the high speed fans and high airflow impedance of the systems.

Also a problem in certain computer system designs is to allow the presence of preheated air in the vicinity of certain of the critical electrical elements requiring cooling. This preheated air is created by the critical elements and other adjacent hardware elements. This condition necessitates an increase in fan airflow to increase the convection cooling rate to compensate for the preheated ambient air temperature in the vicinity of the sensitive elements, which requirement then increases the acoustic noise of the system.

It is a common characteristic of present day computer systems to offer to the trade a basic system, which is adapted to several different use configurations. While the configurations may have different internal electrical elements, they all have a group of similar electrical elements and a common enclosure which makes up the basic system. In this marketing concept the acoustic noise is constant for all configurations of the basic system, for example whether the configuration is intended for a server room, a workstation area or a one person office setting. This manufacturing and marketing scheme represent a disadvantage in not being able to provide a computer system in terms of noise level that is the quietest system for a particular operating setting. For example, it necessitates placing the same basic system from a noise level standpoint in a server room, where a high noise level can be tolerated, and in an office setting where a high noise level can be objectionable.

BRIEF SUMMARY OF THE INVENTION

Against this background, one of the objects of the invention is to provide a computer system, for example a deskside system, in which to provide effective cooling and low levels of acoustic noise the enclosure thereof is separated into at least two element receiving sections, wherein certain heat generating and/or heat sensitive elements of the system are located in a first section and other such elements are located in a second section, and wherein each section has its own element cooling medium moving fan.

The dividing of the enclosure into at least two separate operable sections and in providing separate airflow fans of different types for each section enables a substantial reduction in fan speed and airflow impedance resulting in an improved element cooling arrangement and a corresponding reduction in direct and indirect fan noises and hence a much quieter system. The multiple section construction also allows a reduction in acoustic noise by providing generous intake and exhaust open air areas in each section. In addition it enables the placing of the fans in locations in the enclosure to provide as to at least one of the sections a positive airflow thereby to maximize the cooling effectiveness of certain elements of the computer system. It also allows other critical elements to have their own dedicated blower. These features yield several advantages, namely of a relatively high airflow condition and low airflow impedance resulting in a relatively low acoustic noise arrangement and enable certain hardware heat sensitive elements, such as the CPU modules, to be located in the enclosure in direct line with a created positive airflow to eliminate the preheated air condition.

Another object of the invention is to arrange in a first section of the system the power supply unit or units and disk drive or drives, upstream thereof, these elements requiring heat management, and to provide in the first section at least one air fan between the disk drive and power supply unit, and in a second section to arrange at least one or more other electrical elements of the system requiring heat management upstream of at least one air intake fan of such element or elements of the second section, and wherein said disk drives are isolated from the elements in the second section.

A still further object is to arrange the electrical element or elements of at least the second section of the system requiring cooling in a manner to maximize cooling in terms of the path of airflow and the providing of an air directing component for producing a controlled naturally guided even path of bulk fan airflow and the spot cooling of a selective critical element or elements.

An additional object of the invention is to provide acoustic noise absorbing, air sealing material and elements, specially designed airtight sealed side panel liners, special mountings for elements and barriers to provide spot cooling and to eliminate line-of-site airflow acoustic noise paths.

It is a still further object of the invention to provide a computer system employing the multiple section construction and other noted features capable of being made-up into several configurations having a basic group of internal electrical elements and a common enclosure for all configurations, one configuration having the basic group and at least one more configuration having additional electrical elements, which as to acoustic noise levels allow the selection of a system having a reduction in noise level for not only all configurations, but as between the various configurations providing the lowest noise level for a desired usage, for example an office setting compared to a work station setting or a work station setting compared to a server room setting.

The reference herein to workstation and server are meant to refer to common and well known types of computer systems as are the terms deskside and under the desk and high end systems.

As used herein, the reference to "high airflow" and "low airflow" is meant to refer to the same condition from a different prospective. In terms of the features of the invention that allow a free, direct, unrestricted low impedance flow of air through the enclosure, this condition is referred to as a "high airflow" condition, that is compared to a system having a single enclosure and a high impedance airflow construction discussed above. In terms of the features of the invention that allow the use of low speed fans, low airflow impedance and reduction of preheated air, this is referred to as a "low airflow" condition, as compared with a system where high fan speed is required due to the system having a high impedance and preheated air condition.

BRIEF DESCRIPTION OF THE DRAWINGS

FIG. 4 is a sectional view taken on line 4—4 of FIG. 2, FIG. 5 is a sectional view taken on line 5—5 of FIG. 2, FIG. 5A is an enlarged elevational partial sectional view of the door shown in the front of FIG. 5.

DETAIL DESCRIPTION OF INVENTION

Figure 1A:
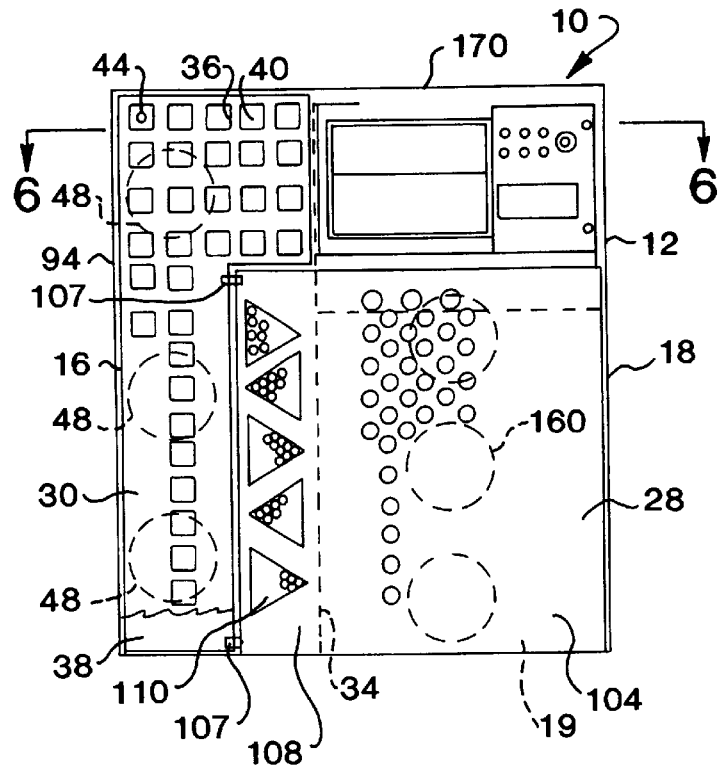
FIG. 1A is an outside elevational view of the front of an enclosure for a computer system incorporating the features of the invention showing the door in its closed position.
Figure 1B:
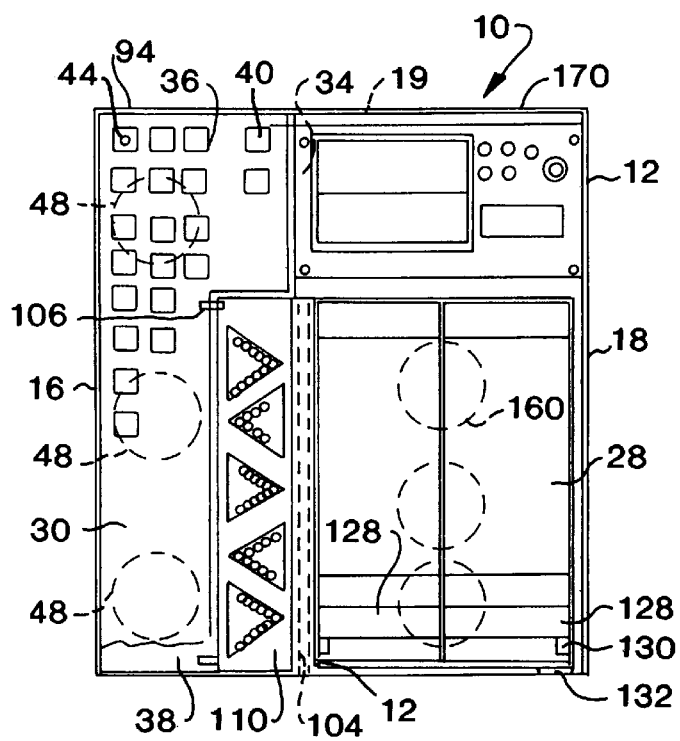
FIG. 1B is a view similar to FIG. 1A, showing the door in its open position.
Figure 2:
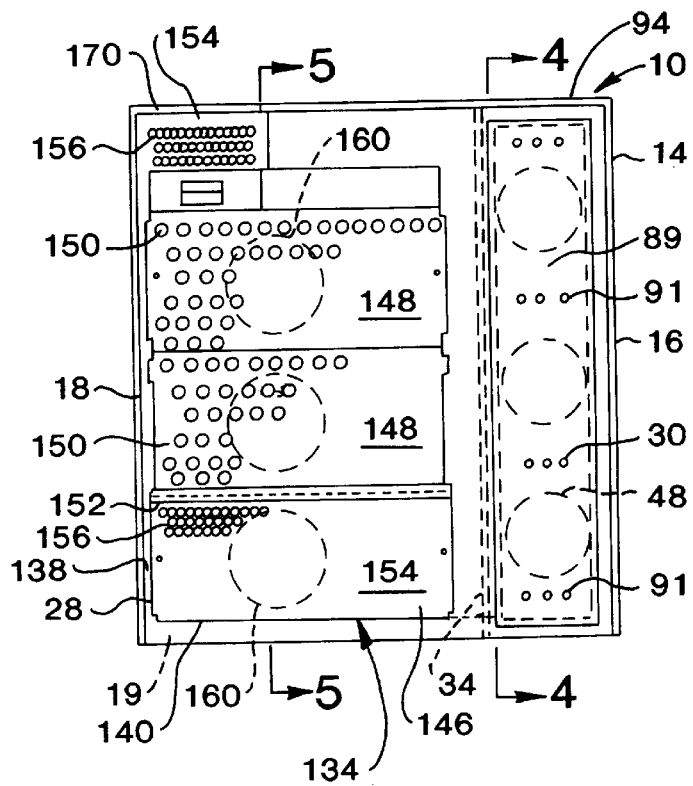
FIG. 2 is a view similar to FIGS. 1A and B, but of the back of the enclosure shown in FIGS. 1A and B.
Figure 3:
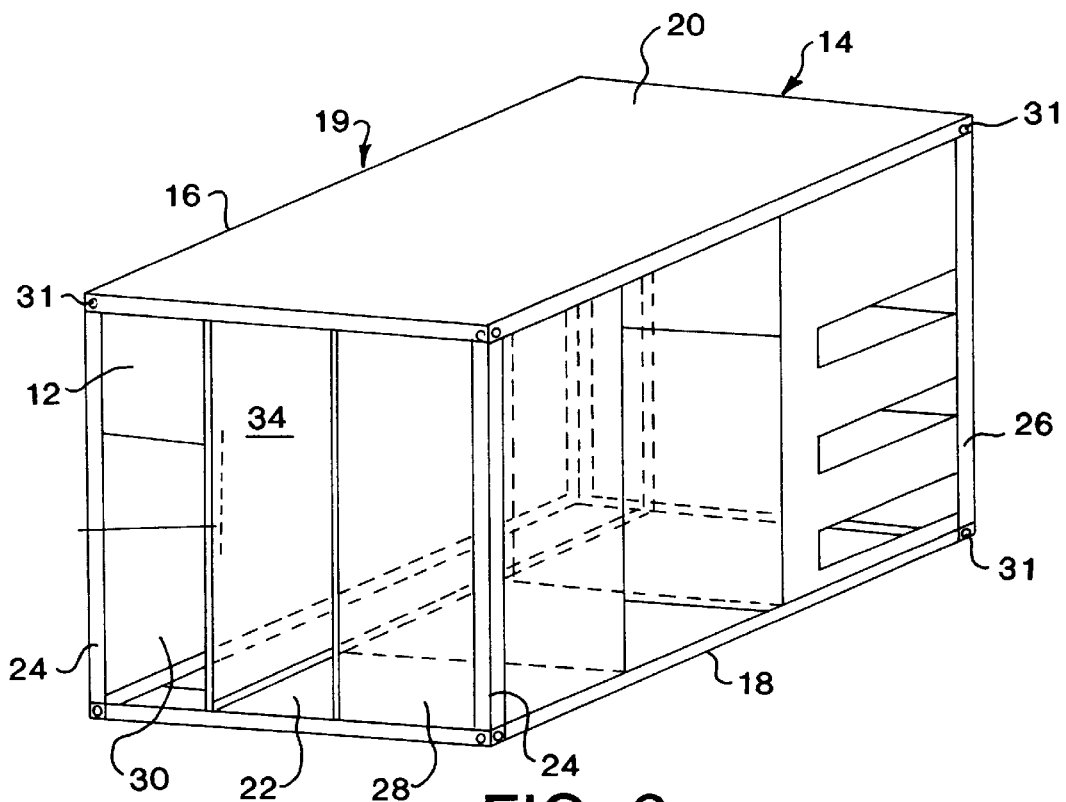
FIG. 3 is a prospective view of the chassis of the computer system shown in FIGS. 1A and B.

With reference to FIGS. 1A, 1B–6 there is illustrated an enclosure 10 for a computer system, for example a system designed to be used in a one person office setting, a multiple person workstation area or in a server room, the office system being of the type employed either beside a desk or under a desk, the later being for example, a high end workstation. The enclosure is a free standing unit having a front 12 (FIGS. 1A & 1B) and back 14 (FIG. 2) of rectangular shape and two opposed sides 16 and 18 also of rectangular shape of a length substantially greater than the width of the enclosure. The enclosure is formed by providing a inner skeleton or chassis 19 (FIG. 3) of sheet metal upper and lower panels 20 and 22, respectively, these panels being joined by front and back vertical sheet metal spaced apart posts, two to a side, the posts for the front being labeled 24 and the back 26, arranged to form opposed pairs and to divide the enclosure into two airflow longitudinal compartments or bays, sections or chambers 28 and 30. FIG. 3 indicates several rivets 31 secure the posts to the panels to form a strong rigid structure. For convenience the compartment 28 will at times hereinafter be referred to as the disk drive side or chamber and the compartment 30 as the CPU side or chamber, it being noted that the CPU side in the transverse dimension is approximately ⅓ the transverse width of the disk drive side. The two compartments are separate by a rigid sheet metal structural member 34 that extends the full longitudinal length and from top to bottom of the enclosure 10 and resists the transfer of radiation and convection heat energy and air passing from one compartment to the other compartment.

Figure 7:
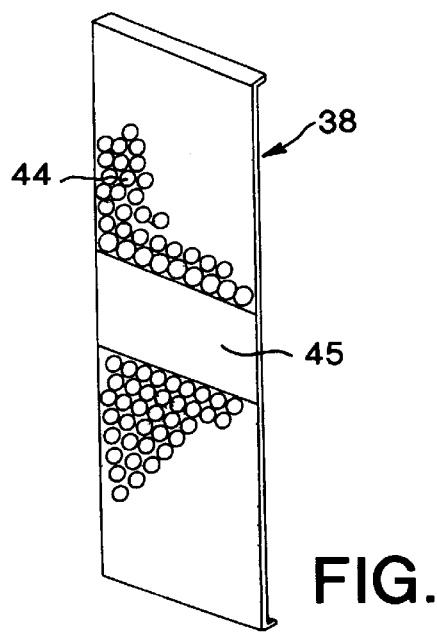
FIG. 7 is an enlarged elevational view of the screen shown in FIGS. 4 and 6.

With reference first to the CPU side 30 as shown in FIGS. 1A, 1B and 4, and approaching it from the front 12 or air inlet side and working towards the back 14, or air outlet side there is provided an inverted L-shaped bezel cover 36 that forms a portion of the outside cover of the front 12 and serves as a continuation of the front along with a door to be referred to later. Behind the bezel cover 36 there is located a screen 38 spaced from the back of the bezel cover, in the unit being discussed by approximately 1½", which is given only as an example, the space being identified as 39 in FIG. 4. The bezel cover and screen extend the full height of the front 12, in which the bezel cover has a series of relatively large ambient air inlet passageways or holes 40 over its entire body and the screen's entire surface is covered by a series of relatively small holes 44 (FIG. 7) for receiving ambient air from the front of the enclosure and through the generous openings of the holes of the bezel cover. The size of the screen holes are approximately 3/32", which is simply an example. The screen 38 has a full width transverse sheet metal section 45 to add stiffness to it, thereby reducing any tendency of the screen to create vibrational acoustic noise.

Figure 6:
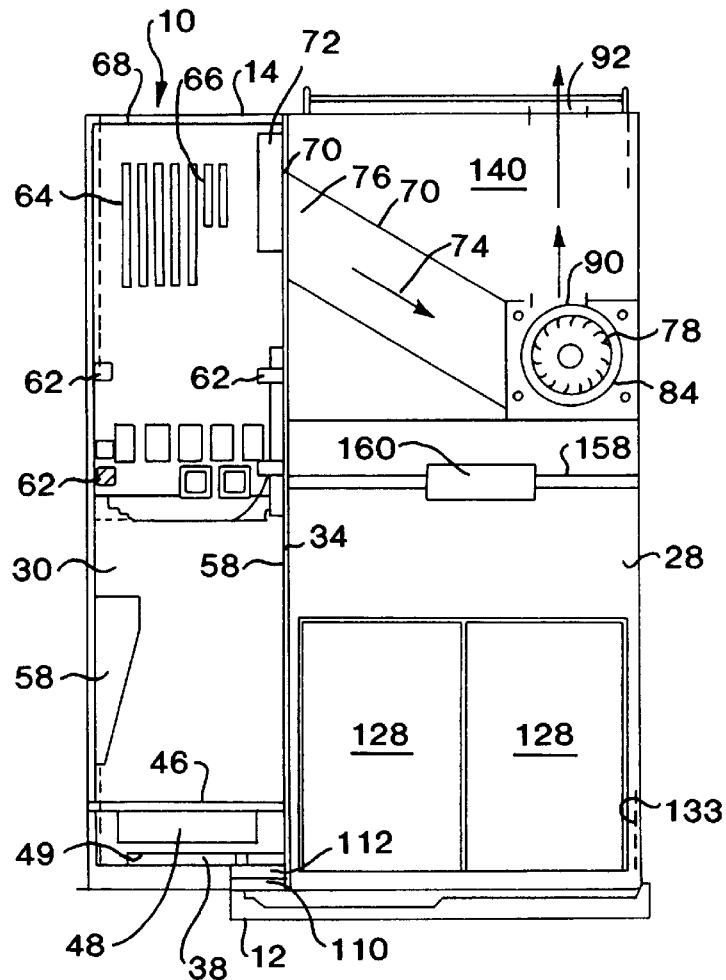
FIG. 6 is a sectional view taken on line 6—6 of FIG. 1A.

As best shown in FIGS. 4, and 6, mounted directly behind the screen 38 is a fan assembly comprised of a fan tray 46 for supporting in an equally spaced aligned relationship three fans 48, the two outer fans being located at the extreme top and bottom of the CPU side. The fans are spaced from the back surface of the screen 38 by a space 49 (FIG. 4) of approximately 1¾", this dimension being only an example. The fans have a relatively low rotational speed of approximate 1700 RPMs having three blades which measure approximately 4½" in diameter, which are given only as examples. The tray is provided with two substantial sheet metal transverse sections 50 (FIG. 4) between the middle fan and the two outer fans to give stiffness to the tray to reduce any tendency of the fans to create vibrational acoustic noise and to isolate the fan tray and the fans from the bezel cover 36 and chassis 19. The tray 46, shown by itself in FIG. 4, is mounted to be received at its top and bottom by plastic mounting supports 52 and 54, respectively, the supports being tightly secured to the adjacent portions of the chassis 19 by screws 56 (only one being indicated) to suppress acoustic vibrational and structure borne noises. Towards the back of the chamber 30, as one views FIG. 6, is mounted on the back adjacent surface of the separating member 34 at least one system board 58, and between the board and fans 48 is positioned an air dam 59, more about which will be said later. The reason for making reference to the system board and air dam here is to point out the several important operational features and relationships of and between the bezel cover 36, screen 38, fans 48 and system board 58.

First to be noted is the relationship and construction of locating the fans 48 at the front of the air dam and CPU section separated from the disk drive side chamber 28 so that in this position the fans can be located directly in line with the system board and other electrical components needing cooling and as a result eliminating any preheated air condition. Second is the construction that allows the fans 48 to have a generous intake and exhaust air space between their front faces and the screen 38 and at their downstream sides, thereby reducing and minimizing acoustic noise due to impedance discussed above. Next is the providing of the bezel cover 36 with its generous open air intake areas 40 and the open air space 49 between the screen 38 and the bezel cover, both designed to absorb acoustic noises from the fans 48.

With reference to FIG. 6 and the system board 58, there is shown that the board is supported by four holding and supporting members 62. As best shown in FIG. 6 the air dam 59 is tapered from front to back as one views FIG. 6 and extends the full height of the chamber 30. As an example, the taper of the air dam shown is approximately 25°, measured from its straight vertical left hand side. In this way forced cooling air from the fans 48 is diverted and compressed and caused to accelerate into the area of the chamber 30 and in the direction where the system board 58 is located and above and below the board. This control of the path of high air flow, even though the speeds of the fans are kept relatively low, is sometime referred to as spot cooling of the electrical components. The board is located approximately in the middle of the chamber so that the directed air from the air dam is caused to pass over and under the board. Also indicated in FIGS. 4 and 6, are several PCI cards 64 and two S-buses 66 mounted in front of a rear screen 68 and which being in the separate chamber 30 receive cooling air from the fans 48 and air dam 59 after passing over the system board 58.

Figure 8:
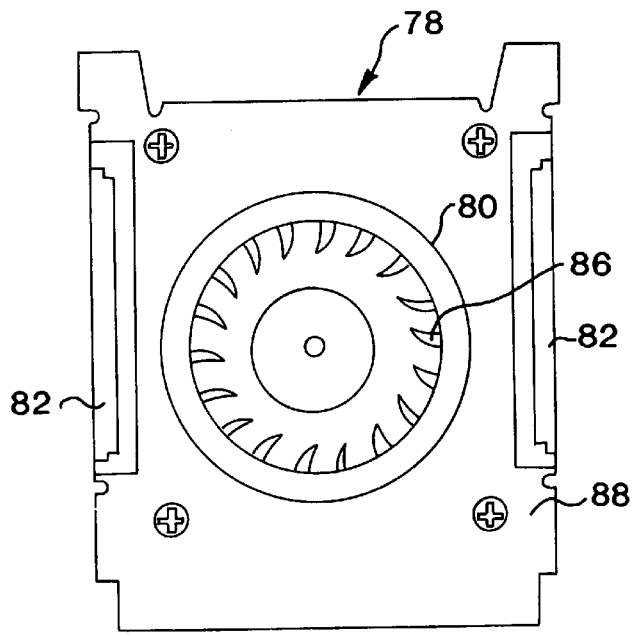
FIG. 8 is an enlarged plan view of the blower shown in FIG. 6.

With still reference to FIGS. 4 and 6, there is shown that at the upper rear inside corner of the CPU chamber 30 extending between the two chambers 28 and 30 and through the separator member 34 an opening 70 is provided immediately adjacent to a graphics card 72. Extending through the opening 70 is a horizontally mounted plastic blower air trough 74 (FIGS. 6), itself having a generous entrance rectangularly shaped opening 76 that extends into the chamber 30, the opening, as an example measuring approximately 6×3 inches. The opening 76 communicates with the air trough 74 that extends from the chamber 30 to a blower 78. FIGS. 6 and 8, illustrate that the trough 74 provides that the opening 76 extends into and communicates with a circular opening 80 formed at the bottom surface of the trough which opens into the chamber 28. The location of the blower in this manner avoids the blower blocking the airflow of the fans 48 and avoids interference in the insertion and removal of the system board 58. It also allows a substantial increase in the airflow of the chamber 30 and allows the creation of a substantial open area for the airflow.

On the two opposed transverse sides of the blower 78 (FIG. 5) parallel tracts 82 (FIGS. 5 and 8) are provided to receive cooperative rails 84 of the blower 78 (FIG. 5) which construction allows the blower to be easily inserted and retracted to and from the chamber 28. The blade 86 (FIG. 8) of the blower 78, as an example measuring approximately 3 inches in diameter, is adapted to fit below the circular opening 80 which receives heated air of the graphics card 72 from the opening 70. The blade 86 of the blower 78 is contained in a housing 88 having a somewhat narrow single opening 90 (FIG. 6) facing the back of the chamber 28 through which opening the heated air from the chamber 30, that is from the graphics card 72, is expelled from the enclosure 10 through an opening 92 at its back 14 (FIG. 6). The plastic trough 74 and the close tight fit provided between the rails 84 and the tracks 82 reduce structure-borne noise. The hardware electrical components identified in chamber 30 are sometimes herein referred to as the basic group of electrical components.

As shown in FIG. 2, at the back of the CPU chamber 30 on the inside of the two posts 26 that define the back of the chamber a screen 89 having holes 91 is secured to the posts. The area between the two screens 38 and 89 of the CPU chamber 30 represents an entirely open unrestricted area for the direct passage of a large volume of air flow from the fans 48 through the section where it is discharged out of the screen 89. As noted, the bezel cover 36 serves to close the CPU chamber 30 at the front of the enclosure 10 and the screen 89 having the outlet air holes 91 serves this function at the back. The side 18 of the enclosure 10 is closed by an inverted one piece L-shaped cover 94, best shown in FIG. 9, that completes the enclosing of the CPU chamber, the top of the cover extending over the chassis 19 co-extensive with the top of the CPU chamber with its side covering the entire side 18. Reference to the acoustic noise suppressing and air sealing construction of the cover 94 will be discussed later with respect to additional Figures.

Figure 9:
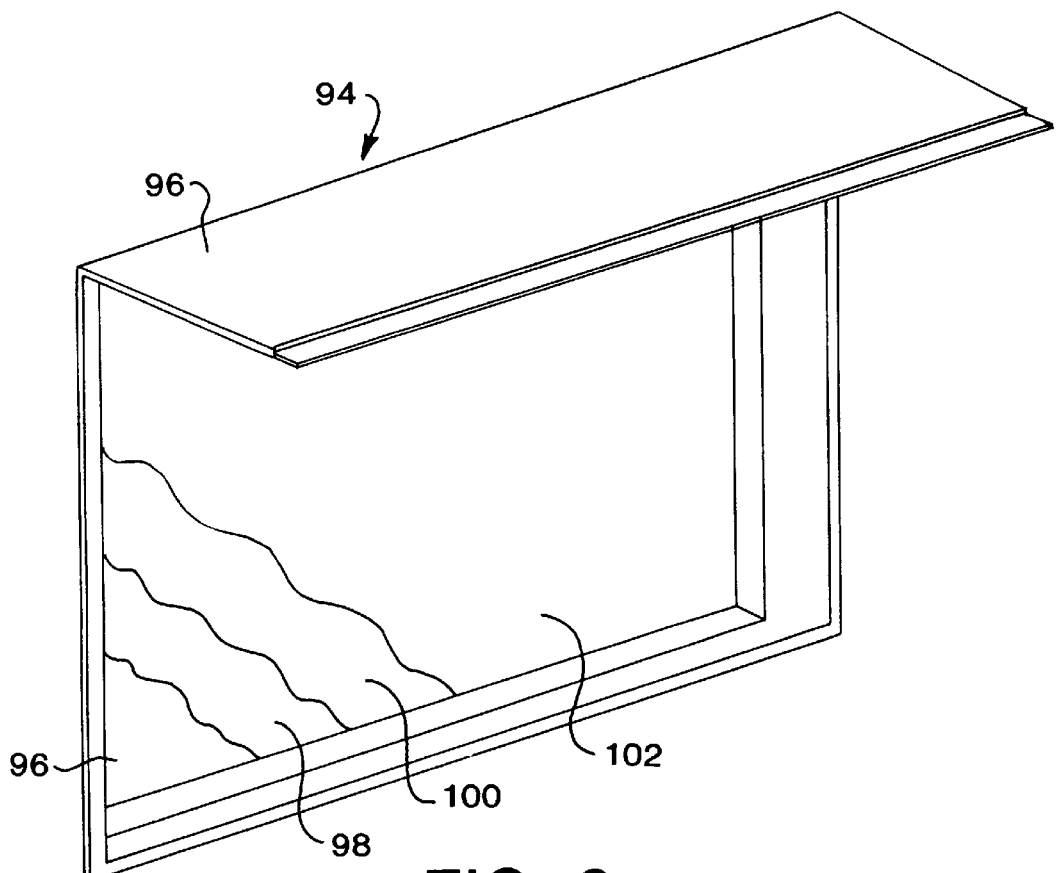
FIG. 9 is a prospective view, with certain portions broken away, of the left cover of the enclosure shown in FIG. 1A and, FIG. 10 is an enlarged prospective view of the rack of the disk drives shown in FIG. 6.

With reference to FIG. 9 illustrating the cover 94 of the side 18 of the enclosure 10 there is shown that the outside of the L-shaped cover is formed of an outer portion of substantially heavy and stiff plastic 96. On the inside of the cover next to the plastic 96 is a thin aluminum foil sheet 98 secured over the entire surface of the inside of the cover. Against the foil 98 is placed a thin substantially rigid metal sheet 100 arranged to substantially cover the foil sheet but inwardly of its outer perimeter. Next to the sheet 100 and secured thereto to cover substantially all of its surface is a foam liner 102 made of Neoprene having an approximate thickness, for example of 1.2 mm. This sandwich construction of plastic, aluminum, sheet metal and foam liner is designed to create an airtight seal to reduce acoustic noise from escaping out from the side 18 of the enclosure 10.

Returning to FIGS. 1A, B, 2, 5A and 6 for the purpose of now describing the disk drive side or chamber 28, attention is directed to the front 12 of the enclosure 10. The chamber 28 at the front of the enclosure in this section is provided with a specially construction door 104 (FIG. 5A) having a front plastic cover member 106. The door is formed to fit into the cut-out portion of the inverted L-shaped front bezel cover 36 where it is hinged at 107 (FIG. 1A) to the bezel cover at its top and bottom at its left vertical side. In this construction the cover 106 on the left hand side of the door is co-extensive with the outside portion of the CPU chamber 30. In this area of the door there is provided five generous intake air openings 108 (FIG. 1A) and directly behind this portion of the door 104 is a plastic screen 110 mounted in front of the screen 38 of the chamber 30 having a thickness relative to the screen 110 that creates an open intake space 112 (FIG. 6) between the screen 110 and the screen 38 of approximately ½ inch, as an example. The screen 110 and open space construction 112, together with the two chamber design allow critical components to be arranged to be in line with the direct airflow into chamber 30 from outside of the enclosure 10.

As shown best in FIG. 5A, the inside of the door 104 is provided with acoustic noise baffling and absorbing foam material 114 made out of approximately 4 lb. Pyrell®. The material is arranged between the front cover 116 of the door 104 and a back metal plate 118. The entire surfaces of the front cover member 116, material 114 and the plate 118 of the door are provided with aligned air holes 120 for admitting generous amounts of outside air into the two chambers 28 and 30. The construction of the door, as to the chamber 28, is designed to absorb acoustic noise and baffle and reduce line of site air-borne acoustic noise paths from the disk drives to the computer user.

Figure 10:
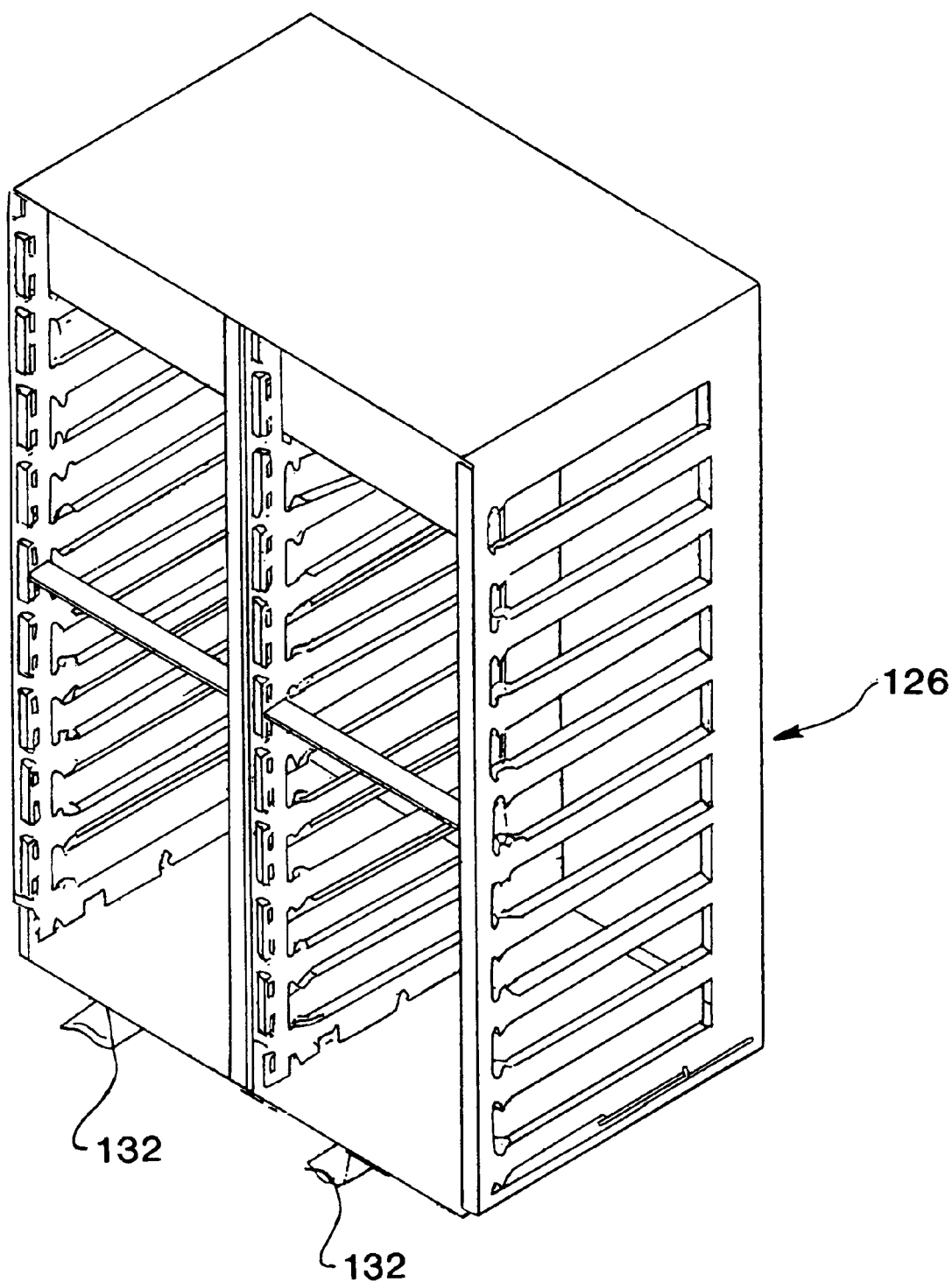

FIG. 5 illustrates that immediately behind the door 104 there is provided a sturdy sheet metal rectangularly shaped receptacle 124 extending towards the back of the enclosure 10 approximately 6 inches, as an example, this dimension being somewhat larger than the length of a disk drive. The height and depth of the receptacle 124 is sufficient to receive a disk drive rack 126 (FIG. 10) capable of handling two to twenty disk drives, staked in two side by side rows of ten each, two of the disk drives being indicated at 128. The receptacle is secured to the chassis 19 at its bottom where there is provided four rubber mounts 132 (FIGS. 1B and 10) at its lower four corners to isolate the disk drive rack from the chassis 19 and reduce vibrational noise from the drives. Other than the contact made by the rubber mounts 127 a generous air space 133 is provided (shown in FIG. 6) between the receptacle and the adjacent portions of the chassis. The holes 120 of the door 104, the material 114 and the plate 118 allow generous outside air to pass directly into the front of the receptacle 124. At the back of the receptacle, its back sheet metal wall 136 has a number of open air slots arranged over its entire surface, one being identified at 138 in FIG. 5. As in the case of the chamber 30 and the basic group of electrical components, the disk drives being mounted in its own chamber and at the very front of the chamber prevent the creation of a detrimental pre-heat air condition.

As shown in FIGS. 2 and 5, at the back of the chamber 28 there is provided three identical shelves 140 made up of a sturdy sheet metal construction, each shelf having a bottom support member 142 and opposed side walls 144 for receiving a power supply unit, for a total of three, one being indicated at 146. In the case where there are being employed less than three power supply units, the back wall of the enclosure 10 is covered over by a sheet metal cover plate 148 having holes 150 over its entire surface to allow air to pass out of the chamber 28. The power unit 146 and the shelves 140 are designed to allow quick and easy insertion and removal of the unit from the chamber by handle 152 (FIG. 5). The front and back of the power unit 146 are provided with front and back plates, one being shown at 154 in FIG. 2, having a plurality of holes 156 for allowing cooling air to pass through the unit. As seen in FIGS. 2 and 5, the upper most power unit is arranged immediately below the blower 78. Above this unit to allow air to be forced out of the chamber 28 by the blower 78 a sheet metal plate 154 is provided directly behind the blower and having air exhaust holes 156 over its entire surface. The path of the air flow between the two chambers and from the blower to the back of the chamber 28 is shown by arrows appearing in FIG. 6. The blower, as in the case of the basic electrical components, fans 48 and 160, power system 146 and disk drives 128, are well known commercial units.

As shown best in FIGS. 2 and 5, between the back of the disk drive receptacle 124 and the front of the shelves 140 of the power supply units 146 there is mounted a second fan tray 158, the trays 158, as in the case of the tray 46, being arranged in a vertical position, as one views FIG. 5. The fan tray 158, being made from rigid sheet metal, receives three equally spaced aligned fans 160 that drive cooling air from the front of the chamber 28 to the back, as such, the fans act as exhaust fans for the disk drives and as blowers for the power supply units. The two outer most fans 160 are located to be substantially co-extensive with the upper most and lower most disk drives 128 and power supply units 146. As in the case of the fan tray 46, the tray 158 is formed with substantially surrounding metal to add stiffness to the assembly for the purpose of reducing fan acoustic and vibrational noises. The trays 158 is carried and connected to the chassis 19 by plastic top and bottom isolation support members 162 tightly secured to the chassis 19 by screws 164 and provided to reduce vibrational and structure borne acoustic noise from the fan assembly. As shown in FIG. 5, between the back of the receptacle 124 and the front of the fan tray 158 and between the tray 158 and the back of the shelves 140 there are provided generous open air areas 166 and 168, respectively, which as in the case of the fans 48 employed in the chamber 30, reduce acoustic noise from the disk drives and fans 160. The dimension of the fans 160 and their speed characteristics are similar to the examples given for the fans 48 of the chamber 30, except in order to produce different sound tones the fans 160 are provided with dissimilar fan blade design compared with the fan blade design of the fans 48.

As in the case of the cover 94 of the chamber 30, the chamber 28 is provided with a similar inverted one piece L-shaped cover 170 that covers the remainder of the top of the enclosure 10 and side 16 of the chamber 28. The cover 170 has the same sandwich construction described above with reference to the cover 94 which is designed to reduce acoustic noise and air from escaping out of the side 16 of the enclosure 10.

| TABLE OF CONFIGURATIONS | | | | | |
| --- | --- | --- | --- | --- | --- |
| 1 | 2 | 3 | 4 | 5 | 6 |
|  | Common Enclosure | Common Section 2 | Disk Drives | Power Supply | Acoustic noise |

-continued

TABLE OF CONFIGURATIONS

| 1 | 2 | 3 | 4 | 5 | 6 |
|---|---|---|---|---|---|
| | | Electrical Elements, i.e. CPU, etc. | | Units | level |
| Office Configuraton | | | 1 to 4 | 1 | 5.4 bels dba |
| Workstation Configuration | | | 4 to 10 | 1 to 2 | 6.3 bels dba |
| Server Configuration | | | 4 to 20 | 2 to 3 | 6.7 bels dba |

The above table is designed to illustrate the multiple configurational feature of the invention. It will be appreciated that while this table identifies three particular configurations, the configurations can be different, for example different configurations of PCs or families of workstations or servers. As used in the table and elsewhere herein, the references to an office system, workstation system and server system or similar references are meant to describe computers in terms of their comparable acoustic noise levels and not necessarily a particular usage. For example, an office setting system and a workstation system can both be workstation type computers, as this terminology is commonly used, the difference being considered is the relative quietness of the systems based on the acoustic noise level of the number of power supply units and disk drives or hard drives being employed in each system.

The table employs six columns identified as 1–6, column 1 identifying examples of three different selected configurational systems, column 2, identifies that the three enclosures of the three configurations are the same, column 3 indicates by the schematic representations of similar packages that the three systems each have the same base group of electrical hardware elements in chamber 30. Columns 4 and 5 identify the number of disk drives and power supply units employed by the three systems in chamber 28. Column 6 reflects examples of typical acoustic noise levels of the three systems. The schematic representations of similar enclosures appearing in column 2 points to the fact that the three enclosures are identical in construction to the enclosure shown in FIGS. 1–10, and that the basic differences among the configurations has to do with the number of disk drives and power supply units the configurations have. Accordingly, the three configurations each have the features of the two section construction, the preferred location of the fans 48 and 160 and blower 78, the open air fan areas, the materials and elements to dampen acoustic noises and the member to direct airflow.

Thus, the identity of the enclosures results in the advantage of not having to place a system high in noise level in a working environment where quietness is at a premium or desirable. This is illustrated in column 6 where a system for an office setting is represented to have an acoustic noise level reading of 5.7 bels dba and therefore has the advantage over a workstation system, whose noise level is given as 6.3 bels dba, which in turn has the advantage over a server system having a level of 6.7 bels dba, wherein in each case the higher noise level is not of the same concern as with the immediately next preceding system. As noted, the stated levels are only typical examples and serve to represent the relative suggested level differences between the three configurations.

By comparison, with reference to a prior art system having the same internal electrical components as the server of the above table, a typical example of the noise level of such a prior art system would be of the order of 7.4 bels dba, the difference between the two systems being found in the basic improved acoustic noise and low air flow construction of the three systems of the table.

In briefly describing the operation of the above described computer system, and in assuming the computer system is booted, the separate chambers 28 and 30 for the various electrical components, i. e. the CPU side 30 and disk drive side 28 of the enclosure 10 allow the separate fans 48, 160 and blower 78 to cool the selected critical elements requiring cooling, the fans/blower being arranged in a manner to maximum the cooling effect by a low airflow system, and as a result of the low speeds of the fans and blower and noise suppressing constructional features, operate at a very low acoustic noise level. The two chambers being constructed to allow generous direct airflow from the front 12 to the back 14 of the enclosure 10 allow the CPU units of the system board 58 to be located immediately adjacent and downstream of the air dam 59 and the disk drives 128 to be located immediately adjacent the front intake air side of the enclosure 10. They also allow the separate i.e. dedicated air fans for each chamber, with sustantial open air intake and exhaust areas, to be ideally located with respect to certain selected electrical components, namely the disk drives 128 and system board 58.

The direct airflow design and the absence of elements that create airflow impedance permit the effective use of the air dam 59, to direct and control the low airflow against designated critical hardware elements such as PCI cards 64 and the S-buses 66. The separate chamber construction also allows the graphics card 72 to be provided with its own blower 78 and to be located immediately adjacent to its blower and thus in this way protected from overheating.

In accordance with the provisions of the patent statutes, we have explained our invention in terms of its preferred embodiment, however, it will be readily understood by those skilled in the art to which the invention pertains that it may be practiced otherwise than illustrated and described. It will also be appreciated that the examples given in describing the invention are only meant to be examples and not limitations of the invention.

What is claimed is:

1. A computer system comprising:
   an enclosure for receiving hardware of the system,
   said enclosure including a first member for creating separate first and second sections, constructed and arranged to form two distinct airflow bays and to resist passage of heat energy from one section to the other, each section comprising air inlet and air outlet sides,
   said first section including an inlet air passageway in said inlet side and an outlet air passageway in said outlet side of said first section,
   said second section including an inlet air passageway in said inlet side and an outlet air passageway in said outlet side of said second section, said second section including at least one inlet cooling fan, a bezel member in the inlet passageway of at least the second section and the opposed sides comprising wall forming members, and a second member arranged in said second section, said second member having an air directing tapered surface that causes cooling air from said inlet cooling fan to be accelerated into an area of said second section.

2. A computer system according to claim 1, said first member constructed as a substantially continuous separating rigid wall between said inlet and outlet sides, said first and second sections being arranged in a side by side relationship to each other, said associated inlet and outlet sides of their respective said sections being arranged in a generally opposed relationship to each other, a medium comprising ambient air, said passageways of said first section being generally aligned with each other, said passageways of said second section being generally aligned with each other, said first section comprising at least one fan, said fans arranged adjacent to a first electrical element and a second electrical element, said second section comprising at least one additional fan, a third electrical element being arranged generally aligned with said inlet air passageway of said second section, said fans arranged between said inlet passageway and said third electrical element, said first electrical element comprises one or more power supply units, said second electrical element comprises one or more disk drives, and said third electrical element comprises at least one printed circuit board having one or more of the following electrical elements:

a CPU module, S bus, PCI and graphics cards.

3. A computer system according to claim 2, wherein said disk drives are arranged adjacent said inlet air passageway of said first section and wherein one or more of said third electrical elements are arranged adjacent said inlet air passageway of said second section.

4. A computer system according to claim 3, wherein said system is configurable into either an office setting, a workstation setting or a server setting, said first section having facilities for receiving at least three said disk drives and at least two said power supply units, said office setting comprising at least one said disk drive and one said power supply unit, said workstation setting comprising at least two said disk drives and at least one said power supply unit, and said server setting comprising at least three said disk drives and at least two said power supply units.

5. A computer system according to claim 2, comprising an air directing baffle member arranged between said inlet air passageway of said first section and said disk drive, said enclosure comprising a chassis, said first section comprising a separate receptacle for receiving a disk drive rack, and said disk drive, rubber mounts arranged at the lower side of said receptacle between and in contact with said chassis for supporting said receptacle, and an air space existing between adjacent surfaces of said receptacle and said chassis.

6. A computer system according to claim 2, wherein said second section comprising a third electrical element requiring cooling wherein said cooling fan arranged between said third electrical element and said inlet air passageway of said second section.

7. A computer system according to claim 1, wherein said first section comprises:

a first electrical element requiring cooling arranged adjacent said outlet air passageway of said outlet side of said first section, a second electrical element requiring cooling arranged inwardly in said enclosure relative to said first electrical element, at least one cooling fan arranged between said first and said second electrical elements of said first section.

8. The computer system of claim 1, further comprising:

said first section having a blower arranged above an electrical element.

9. The computer system of claim 1, wherein the wall forming members comprise a sandwich construction of an outer plastic member, an inner sheet metal member contiguous to the outer plastic member and an inner most foam member contiguous to the inner sheet metal member.

10. A computer system comprising:

an enclosure for receiving hardware of the system, said enclosure including a first member for creating separate first and second sections, constructed and arranged to form two distinct airflow bays and to resist passage of heat energy from one section to the other, each section comprising air inlet and air outlet sides, said first section including an inlet air passageway in said inlet side and an outlet air passageway in said outlet side of said first section, said second section including an inlet air passageway in said inlet side and an outlet air passageway in said outlet side of said second section, said second section including at least one inlet cooling fan, a second member arranged in said-second section, said second member having an air directing tapered surface that causes cooling air from said inlet cooling fan to be accelerated into an area of said second section, said first member constructed as a substantially continuous separating rigid wall between said inlet and outlet sides, said first and second sections being arranged in a side by side relationship to each other, said associated inlet and outlet sides of their respective said sections being arranged in a generally opposed relationship to each other, a medium comprising ambient air, said passageways of said first section being generally aligned with each other, said passageways of said second section being generally aligned with each other, said first section comprising at least one fan, said fans arranged adjacent to a first electrical element and a second electrical element, said second section comprising at least one additional fan, a third electrical element being arranged generally aligned with said inlet air passageway of said second section, said fans arranged between said inlet passageway and said third electrical element, said first electrical element comprises one or more power supply units, said second electrical element comprises one or more disk drives, said third electrical element comprises at least one printed circuit board having one or more of the following electrical elements:

a CPU module, S bus, PCI and graphics cards, said second section comprising said third electrical element requiring cool wherein said cooling fan arranged between said third electrical element and said inlet air passageway of said second section, wherein said air cooling fans of said first section comprise exhaust fans with respect to said second electrical element, said air cooling fans of said second section comprise positive air moving fans with respect to said third electrical element, said first and second sections each comprising corresponding bottom and top portions, one or more said third electrical elements of said second section being arranged adjacent said outlet side of said second section and said top portion thereof, an additional air passageway arranged between said first and second sections in said top portions thereof, and a blower arranged in said first section in said top portion thereof above said power supply units for directing air away from said one or more of said third electrical elements into said additional air passageway and through said outlet air passageway of said fist section.

11. A computer system according to claim 10, said enclosure comprising sub-support members for said disk drive, said fans and said blower, and structure borne noise reduction support members arranged between said sub-support members and said disk drives, said fans and said blower for supporting said disk drives, said fans and said blower in a manner to reduce structure borne noise thereof.

12. A computer system comprising:

an enclosure for receiving hardware of the system, said enclosure including a first member for creating separate first and second sections, constructed and arranged to form two distinct airflow bays and to resist passage of heat energy from one section to the other, each section comprising air inlet and air outlet sides, said first section including, an inlet air passageway in said inlet side and an outlet air passageway in said outlet side of said first section, said second section including an inlet air passageway in said inlet side and an outlet air passageway in said outlet side of said second section, said second section including at least one inlet cooling fan, a second member arranged in said second section, said second member having an air directing tapered surface that cause cooling air from said inlet cooling fan to be accelerated into an area of said second section, said first member constructed as a substantially continuous separating rigid wall between said inlet and outlet sides, said first and second sections being arranged in a side by side relationship to each other, said associated inlet and outlet sides of their respective said sections being arranged in a generally opposed relationship to each other, a medium comprising ambient air, said passageways of said first section being generally aligned with each other, said passageways of said first section being generally aligned with each other, said first section comprising at least one fan, said fans arranged adjacent to a first electrical element and a second electrical element, said second section comprising at least one additional fan, a third electrical element being arranged generally aligned with said inlet air passageway of said second section, said fans arranged between said inlet passageway and said third electrical element, said first electrical element comprises one or more power supply units, said second electrical element comprises one or more disk drives, said third electrical element comprises at least one printed circuit board having one or more of de following electrical elements:

a CPU module, S bus, PCI and graphics cards, said second section comprising said third electrical element requiring cooling wherein said cooling fan arranged between said third electrical element and said inlet air passageway of said second section, said enclosure comprises a rectangularly shaped box comprising front and back portions and wherein said first and second sections assume a side by side contiguous relationship, said inlet passageways arranged in said front portion and said outlet passageways arranged in said back portion, said box comprising opposed sides, a bezel member arranged in said inlet air passageway of at least said second section and said opposed sides comprising wall forming members, said bezel member and said wall members comprising acoustic noise absorbing material, and said wall members comprise a sandwich construction comprised of an outer plastic member, an inner sheet metal member contiguous to said outer plastic member and an innermost foam member contiguous to said inner sheet metal member.

13. A method of constructing a computer system comprising the steps of:

forming an enclosure for receiving hardware of the system, mounting a first member in said enclosure in a manner to create separate first and second sections, constructed and arranged to form two distinct airflow bays and to resist passage of heat energy from one section to the other, in forming said first and second sections forming for each section an air inlet and an air outlet side, forming in said first section an inlet air passageway in said inlet side and an outlet air passageway in said outlet side, mounting in said first section one or more first electrical elements requiring cooling arranged adjacent said outlet air passageway of said outlet side of said first section, mounting in said first section one or more second electrical elements requiring cooling inwardly in said enclosure relative to said first electrical elements, mounting in said first section one or more first air cooling fans arranged between said first and second electrical elements, forming in said second section an inlet air passageway in said inlet side and an outlet air passageway in said outlet side of said second section, mounting in said second section one or more third electrical elements requiring cooling arranged generally aligned with said inlet air passageway of said second section, mounting in said second section one or more second air cooling fans arranged between said third electrical element and said inlet air passageway of said second section, arranging a bezel member in the inlet passageway of at least the second section and the opposed sides comprising wall forming members, and mounting in said second section a second member having an air directing tapered surface that causes cooling air from said second air cooling fans to be accelerated into an area of said second section where said third electrical elements are located.

14. A method according to claim 13, the additional steps:

in mounting said air cooling fan in said first section causing said fan to function as an exhaust fan with respect to said second electrical element, and in mounting said air cooling fan in said section causing said fan to function as a positive air moving fan.

15. The method of claim 13, further comprising:

mounting a blower arranged in said first section above at least one first electrical element.

16. The method of claim 13, wherein the wall forming members comprise a sandwhich construction of an outer plastic member, an inner sheet metal member contiguous to the outer plastic member and an inner most foam member contiguous to the inner sheet metal member.

17. A method of constructing a computer stem comprising the steps of:

forming an enclosure for receiving hardware of the system, mounting a first member in said enclosure in a manner to create separate first and second sections, constructed and arranged to form to distinct airflow bays and to resist passage of heat energy from one section to the other, in forming said first and second sections forming for each section an air inlet and an air outlet side, forming in said first section an inlet air passageway in said inlet side and an outlet air passageway in said outlet side, mounting in said first section one or more first electrical elements requiring cooling arranged adjacent to said outlet air passageway of said outlet side of said first section, mounting in said first section one or more second electrical elements requiring cooing inwardly in said enclosure relative to said first electrical elements, mounting in said first section one or more first air cooling fans arranged between said first and second electrical elements, forming in said second section an inlet air passageway in said inlet side and an outlet air passageway in said outlet side of said second section, mounting in said second section one or more third electrical elements requiring cooling arranged generally aligned with said inlet air passageway of said second section, mounting in said second section one or more second air cooling fans arranged between said third electrical element and said inlet air passageway of said second section, mounting in said second section a send member having an air directing tapered surface that causes cooling air from said second air cooling fans to be accelerated into an area of said second section where said third electrical elements are located, arranging said first and second sections in a side by side relationship to each other, arranging said first member as a substantially rigid separating wall between said inlet and outlet sides, arranging said associated inlet and outlet sides of their respective said sections in a generally opposed relationship to each other, arranging said associated passageways of said first section in a generally aligned relationship with each other, and said associated passageways of said second section in a generally aligned relationship with each other, arranging said air cooling fan of said first section adjacent to said first and second electrical elements, in mounting said first electrical element including one or more power supply units, in mounting said second electrical element including one or more disk drives, and in mounting said third electrical element including one or more printed circuit boards having one or more of the following electrical elements:

a CPU module, S bus, PCI and graphics cards.

18. A method according to claim 17, the additional step of arranging said disk drive adjacent said inlet air passageway of said first section.

19. A method according to claim 17, the additional steps of forming said enclosure in the form of a rectangularly shaped box having front and back portions, arranging said inlet passageways in said front portion and arranging said outlet passageway in said back portion, forming said box to have opposed sides, mounting a bezel member in said inlet air passageway of at least said second section, forming said opposed sides to take the form of wall members, forming said bezel member and said wall members of an acoustic noise absorbing material, and forming each said wall member to take the form of a sandwich construction comprised of an outer plastic member, an inner sheet metal member contiguous to said outer plastic member and an inner most foam member contiguous to said inner sheet metal member.

20. A method according to claim 17, the additional step of mounting an air directing baffle member between said inlet air passageway of said first section and said disk drive.

21. A method of constructing a computer system comprising the steps of:

forming an enclosure for receiving hardware of the system, mounting a first member in said enclosure in a manner to create separate first and second sections, constructed and arranged to form two distinct airflow bays and to resist passage of heat energy from one section to the other, in forming said first and second sections forming for each section an air inlet and an air outlet side, forming in said first section an inlet air passageway in said inlet side and an outlet air passageway in said outlet side, mounting in said first section one or more first electrical elements requiring cooling arranged adjacent to said outlet air passageway of said outlet side of said first section, mounting in said first section one or more second electrical elements requiring cooling inwardly in said enclosure relative to said first electrical elements, mounting in said first section one or more first air cooling fans arranged between said first and second electrical elements, forming in said second section an inlet air passageway in said inlet side and an outlet air passageway in said outlet side of said second section, mounting in said second section one or more third electrical elements requiring cooling arranged generally aligned with said inlet air passageway of said second section, mounting aid second section one or more second air cooling fans arranged between said third electrical element and said inlet air passageway of said second section, mounting in said second section a second member having an air directing tapered surface that causes cooling air from said second air cooling fans to be accelerated into an area of said second section where said third electrical elements are located, forming open air areas between said associated inlet air and outlet air passageways of said first and second sections and said associated cooling fans of said first and second sections, in forming said first and second sections forming in each section corresponding bottom and upper portions, arranging at least one of said third electrical elements of said second section adjacent to said outlet side of said section and said upper portion thereof, forming an additional air passageway between said first and second sections in said upper portions thereof, and arranging a blower in said first section in said upper portion thereof above said power supply unit for directing air away from one or more said third electrical elements into said additional passageway and through said outlet air passageway of said first section.

22. A method according to claim 21, the additional steps of forming in said enclosure sub-support members for said disk drive, said fans and said blower, and forming structure borne noise reduction support members between said sub-support members and said disk drive, said fans and said blower for supporting said disk drive, said fans and said blower in a manner to reduce structure borne noise thereof.

23. A computer system comprising an enclosure means for receiving hardware of the system, said enclosure means including a means for creating two side by side first and second separate section means for separating electrical elements constructed and arranged to form two distinct airflow bays and to resist passage of heat energy from one section means to the other, each section means comprising air inlet and air outlet sides, said first section means including an inlet air passageway in said inlet side and an outlet air passageway in said outlet side, said passageways being generally aligned, said first section means including one or more first electrical elements requiring cooling arranged adjacent to said outlet air passageway of said outlet side of said first section means, said first section means including one or more second electrical elements requiring cooling arranged inwardly in said enclosure relative to said first electrical means, said first section means including one or more air cooling means for cooling said first and second electrical elements, said air cooling means arranged between said first and second said electrical elements of said first section means, said second section means including an inlet air passageway in said inlet side and an outlet air passageway in said outlet side of said second section means, said second section means including one or more third electrical elements requiring cooling arranged generally aligned with said inlet air passageway thereof, said second section means including one or more inlet air cooling means for cooling said third electrical element, said air cooling means arranged between said third electrical elements and said inlet air passageway thereof, a bezel member in the inlet passageway of at least the second section and the opposed sides comprising wall forming members, and said second section means including airflow directing means on the downstream side of said inlet air cooling means of said second section means for directing air over at least one of said second section means for directing air over at least one of third electrical elements, said airflow directing means for accelerating cooling air from said inlet air cooling means over at least one of said third electrical means.

24. The computer system of claim 23, further comprising: a blower arranged in said first section above at least one first electrical element.

25. The computer system of claim 23, wherein the wall forming members comprise a sandwich construction of an outer plastic member, an inner sheet metal member contiguous to the outer plastic member and an inner most foam member contiguous to the inner sheet metal member.

* * * * *